United States Patent [19]

Compare

[11] 3,784,380

[45] Jan. 8, 1974

[54] METHOD FOR MANUFACTURING ARTWORK FOR PRINTED CIRCUIT BOARDS

[75] Inventor: Giampiero Compare, Milan, Italy

[73] Assignee: Honeywell Information Systems Italia, Caluso, Italy

[22] Filed: Oct. 28, 1971

[21] Appl. No.: 193,481

[30] Foreign Application Priority Data

Nov. 11, 1970 Italy ..... 31569/70

[52] U.S. Cl. ..... 96/44, 96/41, 96/362

[51] Int. Cl. ..... G03c 5/06

[58] Field of Search ..... 96/36.2, 41, 38, 96/45, 44, 27; 11/11

[56] References Cited

UNITED STATES PATENTS

| | | | |
|---|---|---|---|
| 3,594,168 | 7/1971 | Compare | 96/36.2 |
| 3,453,037 | 7/1969 | Middleton et al. | 96/36.2 X |
| 3,669,666 | 6/1972 | Klietman et al. | 96/36.2 |
| 3,385,702 | 5/1968 | Koehler | 96/41 |
| 3,508,919 | 4/1970 | Reimer | 96/36.2 |
| 3,423,205 | 1/1969 | Skaggs et al. | 96/36.2 |

*Primary Examiner*—Norman G. Torchin
*Assistant Examiner*—Edward C. Kimlin
*Attorney*—Fred Jacob et al.

[57] ABSTRACT

A method is provided for manufacturing matrix artworks for use in fabricating printed circuit boards which includes submitting a photographic plate to subsequent exposures through different masking means, to obtain latent images whose superposition, after development, results in the final artwork. Optical reference means, for ensuring the exact superposition of the latent images, are obtained by partial development of the plate in well defined marginal areas of the same.

11 Claims, 25 Drawing Figures

Giampiero COMPARE
INVENTOR
By [signature]
ATTORNEY.

Giampiero COMPARE
INVENTOR

By [signature]

ATTORNEY

Giampiero COMPARE
INVENTOR
By [signature]
ATTORNEY

Giampiero COMPARE
INVENTOR

By [signature]
ATTORNEY

Giampiero COMPARE
INVENTOR

By [signature]
ATTORNEY

Giampiero COMPARE
INVENTOR.
By [signature]
ATTORNEY.

METHOD FOR MANUFACTURING ARTWORK FOR PRINTED CIRCUIT BOARDS

BACKGROUND OF THE INVENTION

The present invention is related to a method for manufacturing matrix artworks used in the fabrication of printed circuit boards, particularly for the boards used to support integrated circuit units, said method being almost exclusively based on photographic and optic operations.

The printed circuit boards used for supporting and connecting the components of modern electronic devices are usually obtained by photoetching a thin metallic foil strongly adherent to a plane insulating board, on one, or more frequently, on both of its faces. The photoetching of the foil requires the use of masking means usually called artwork, which may be a photographic plate bearing the pattern, at the actual size, and with the maximal attainable precision, of all connecting leads, pads and other conductive regions required on the board.

Prior art methods used for obtaining this artwork are generally based on the photographic reduction to the actual size of a large scale drawing of the printed circuit. Therefore large scale drawings must be prepared, one for each circuit, and high cost, high precision photographic apparatus must be employed for reducing the large scale drawings to the actual size, under very tight tolerances.

Other methods are based on direct plotting of the photographic plate by a high precision plotting machine, digitally controlled by a suitably programmed computer. In this instance the process, beside requiring very costly apparatus, is relatively slow, and includes the cost of the producing, testing and correcting the program for controlling the computer. U.S. Pat. No. 3,594,168, granted July 20, 1971, and copending U.S. Pat. application Ser. No. 735,462, filed June 7, 1968, corresponding to Italian Pat. No. 816,880, both assigned to the same assignee as the present application, describe a process suitable for the present purpose, based on the use of high precision master masks, common to all printed circuit boards of a same constructive standard, and of partial masks, specific for each board. The process provides high precision and a sufficient cost economy; however, it requires a number of manual operations, and some mechanically manufactured devices, and in this respect, may be substantially improved upon.

SUMMARY OF THE INVENTION

The present invention provides a method for obtaining artworks, which requires optical and photographic operations almost exclusively, and allows one to obtain, in a short time and at reduced costs, the master masks and the partial masks, from which the final artwork, having the high precision required, is produced.

This method is particularly adapted for printed circuit boards used for supporting and connecting integrated circuit units. In this case, the printed circuit leads usually consist of rectilinear lines of conductors, of constant width, spaced by a constant pitch, directed along two mutually perpendicular directions. The leads connect the pads, to which the pins of the integrated unit are soldered, and the plugs provided for external connection of the circuit. The pads are located at the crossing points of a square matrix, having a pitch equal to, or a multiple of, the pitch of the leads. It shall be understood that the method described may be used for printed circuits having different uses, provided they fulfill the above conditions.

The process according to the invention requires that a photographic plate be submitted to subsequent exposures through different masking means, to obtain latent images whose superposition after development, results in the final artwork; optical reference means, for ensuring the exact superposition of the latent images, are obtained by partial development of the plate in well defined marginal areas of the same.

A characterizing feature of the present invention is the use of purely optical means for obtaining a master mask comprising all possible pads, from the master masks of the rectilinear leads, as well as for obtaining the partial masks of the lines of the leads. The final mask for the leads is obtained by a subtractive process, that is, by deleting the unwanted lines of the leads from the latent image comprising all possible rectilinear leads.

BRIEF DESCRIPTION OF THE DRAWINGS

These and other features and advantages of the invention will be better explained by the detailed description of a preferred embodiment, and by inspection of the attached drawings, whereby.

Figure 6:
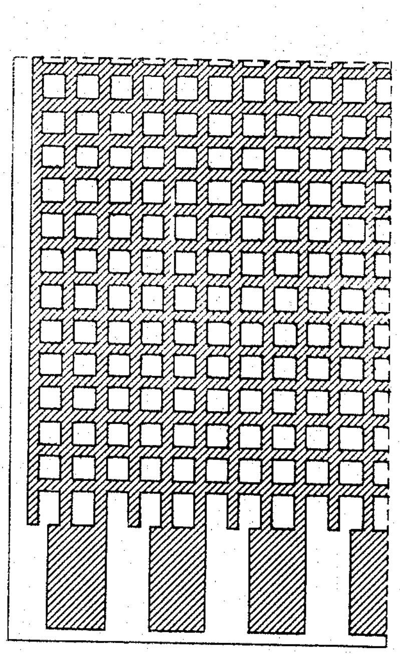
FIG. 6 is a mask obtained from the master masks of FIGS. 2, 3 and 4, containing all possible leads and plugs.
Figure 13:
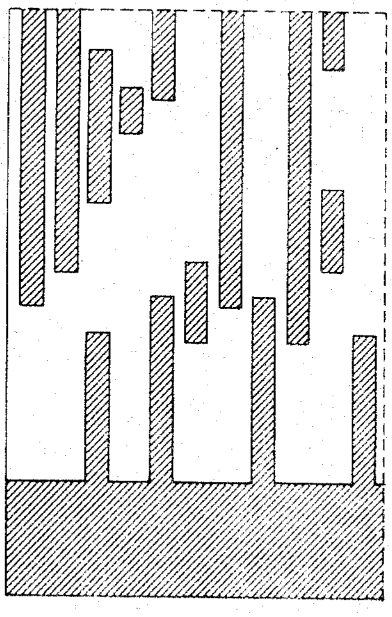
Figure 15:
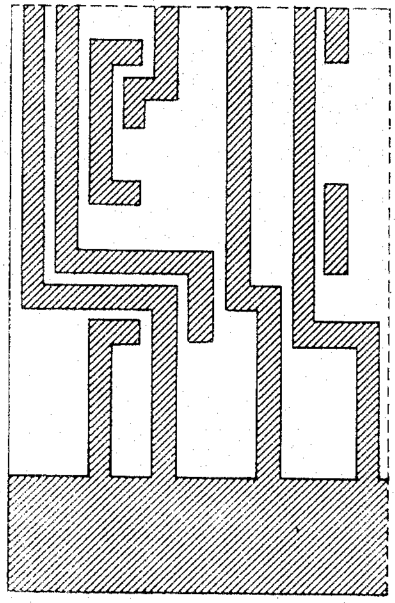
Figure 14:
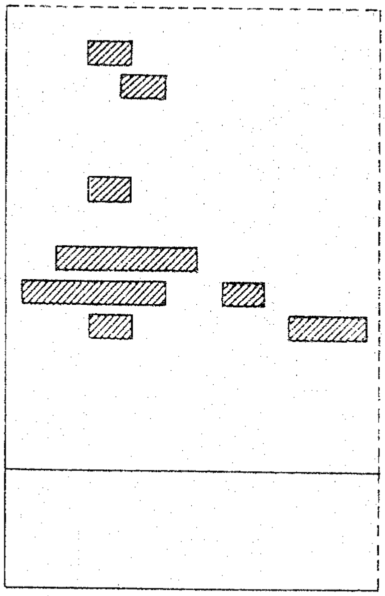
Figure 16:
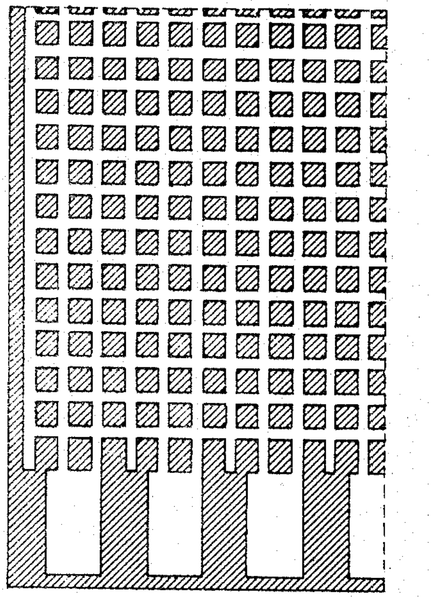
Figure 17:
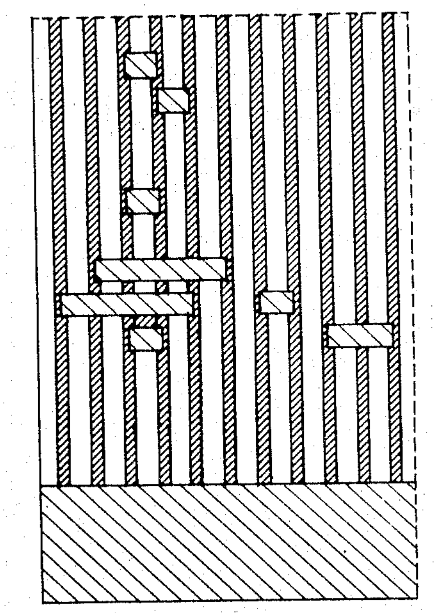
Figure 18:
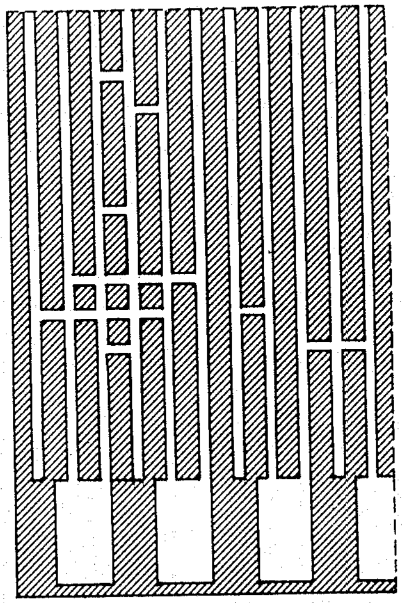
Figure 19:
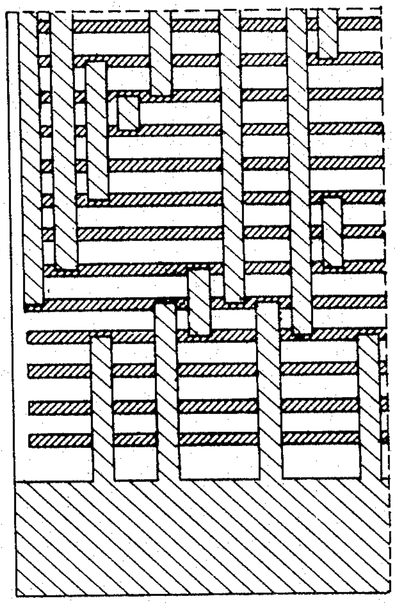
Figure 20:
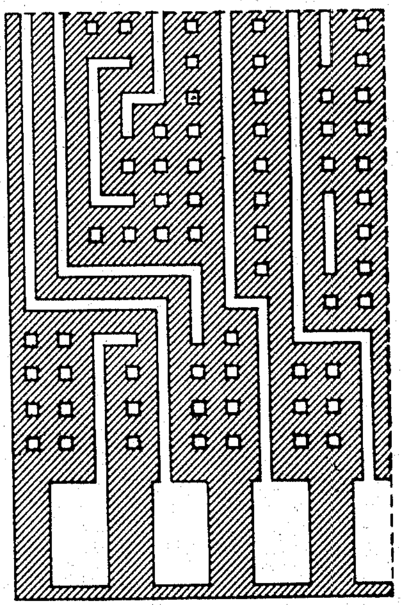
Figure 21:
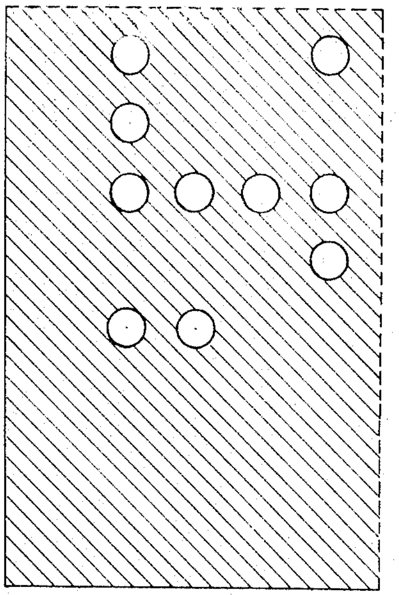
Figure 22:
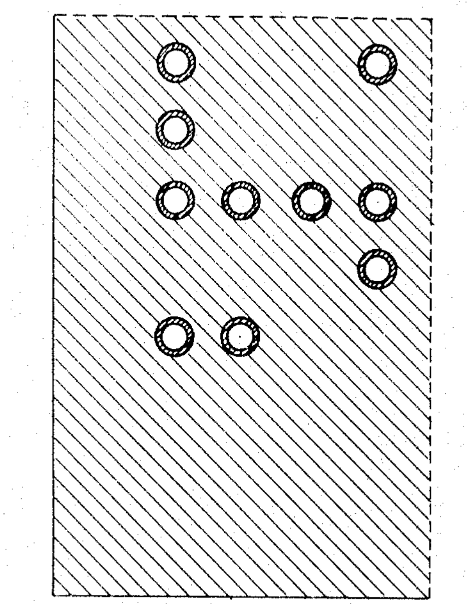
Figure 23:
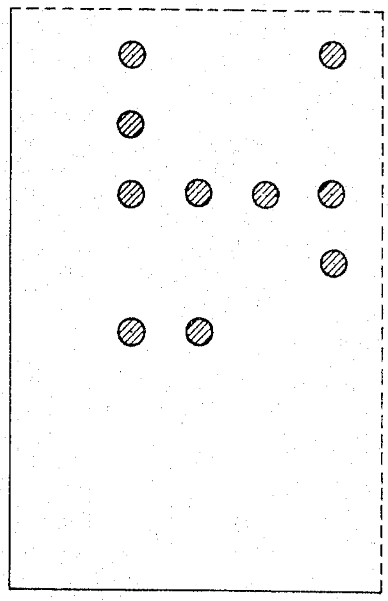

FIGS. **12*a* and 12*b*** illustrate the results of said exposure;

FIGS. 13 and 14 represent the partial masks for vertical and horizontal leads;

FIG. 15 represents a mask comprehensive of all the widened leads;

FIG. 16 shows the latent image after exposure through the mask of FIG. 6;

FIG. 17 represents the composite mask for the horizontal leads;

FIG. 18 represents the residual latent image after exposing the plate of FIG. 16 through the mask of FIG. 17;

FIG. 19 shows the composite mask of the vertical leads;

FIG. 20 shows the residual latent image of the plate of FIG. 18 after exposure through the mask of FIG. 19;

FIG. 21 shows the partial mask for the pads;

FIG. 22 shows the composite pad mask;

FIG. 23 shows the latent image of the pads, and

Figure 1:
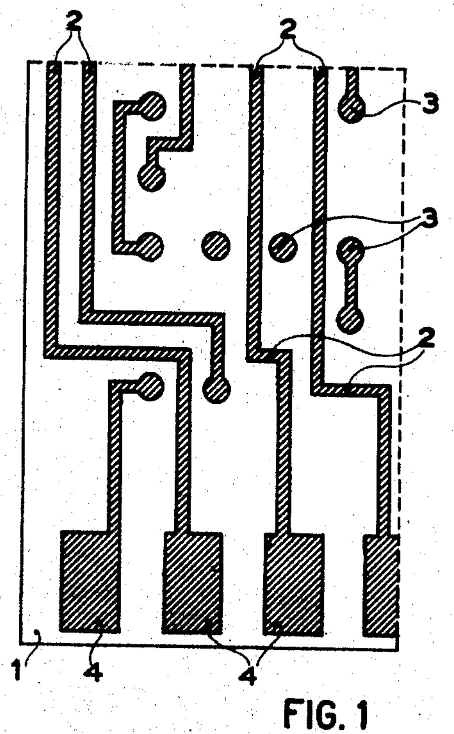
FIG. 1 is a portion of a printed circuit, which is to be obtained by the process according to the invention.
Figure 24:
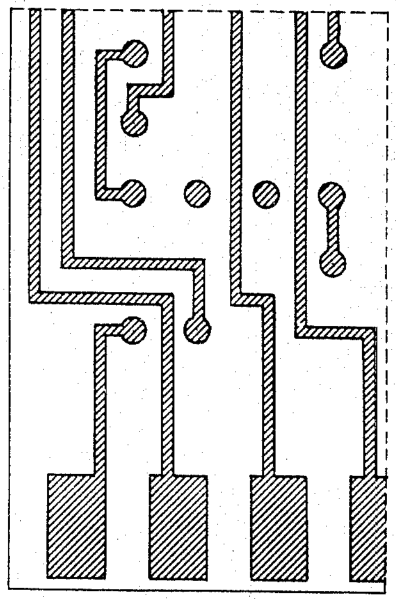

FIG. 24 shows the complete final artwork, after development, for the portion of printed circuit of FIG. 1.

DESCRIPTION OF A PREFERRED EMBODIMENT

FIG. 1 represents, on an enlarged scale, a portion of a face of a printed circuit board for integrated circuit units. The conductive elements which compose the printed circuit may be distinguished in: "leads" 2, formed by rectilinear lines of conductors, of constant width, directed according to two mutually perpendicular directions, and mutually spaced by a contant pitch; "pads" 3, substantially circular in shape, provided for receiving and connecting the pins of the integrated circuit units, and for interconnecting the leads on opposed faces of the board; and "plugs" 4 provided for connecting the board to the external circuit, usually by means of plug-and-socket connectors.

The two directions of the lead lines will be for convenience, called respectively "horizontal" and "vertical."

It should be remarked that the plugs are, in number, shape and location equal for all the printed circuit boards following a same constructional standard. In addition to the plugs, there may be other common metalized elements, for example indexes or reference marks for mounting supporting members, frames, and so on. These common elements, which have the same shape and location for all the printed circuits of the same standard, will be treated as the plugs.

The leads may have, for example the width of 0.4 mm (appr. 16 mils) and be spaced by a definite pitch for example 1.27 mm. (50 mils); the pads have for instance, a diameter of appr. 1.4 mm. (55 mils) and are located at crosspoints of an ideal square matrix, having, for example a pitch double that of the leads, that is 2.54 mm, (100 mils).

These dimensions are equal for all printed circuits of the same standard. The layout of the leads and the number and location of the pads vary with each printed circuit. In the frequent case of a printed board having printed circuits on both its faces, the layout of the leads is different for each face, but the location of the pads must be the same, and the pads on the opposite faces must correspond to one another with very high precision.

The method according to the invention comprises essentially in employing high precision models for providing master masks, each one containing a type of conducting element for the whole extension of the usable surface, that is vertical leads, horizontal leads, and plugs; in obtaining, by optical — photographical means and with the same precision, secondary masks: one comprising the whole set of leads and plugs, and the other, obtained through a particular optical process, comprising all possible pads. Moreover, using a large scale drawing of the specific circuit considered as a source and by optical and photographic processes of relatively lower precision, partial masks are provided comprising the leads and pads effectively required for the specific circuit. Then by using composite masks and subsequent exposures, the lines of the leads, and the plugs which are not required in the specific circuit, are deleted from a latent image comprising all possible leads and plugs. Lastly, by adding to said latent image of the artwork thus obtained, the latent image of the required pads, and developing the plate, the final artwork is obtained.

The precision in the superposition of the different latent images, and, in general in the subsequent exposures to two or more masks, is obtained by proper optical referece marks which are exposed and developed on the plates, independently of the developing of the area reserved to the printed circuit elements, according to the process for partial development described in the cited Italian Pat. No. 816,880.

The single steps of the process are now described in detail.

HIGH PRECISION MODELS

Three different high precision models are required, that is, one for vertical leads, one for horizontal leads, and one for the plugs. These models may be obtained for instance by directly scribing, by means of a coordinatograph or other high precision tracing machine, the uniformly black and opaque emulsion of a photographic plate, previously entirely exposed to light, and developed. After scribing, the portions of emulsion, corresponding to regions which must be transparent, are peeled off. It is thus possible to obtain tolerances of 25 microns (1 mil.) on the dimension of the pattern, which is fully satisfactory. High precision apparatus, however costly, and the full time needed for the maximum accuracy may be employed in the preparation of these models, without incurring excessive costs, as they are prepared in single specimens which serve for all the printed circuits of the same standard.

MASTER MASKS

From the high precision model, a sufficient number, which may be practically unlimited, of master masks for vertical leads, horizontal leads and plugs, is obtained by contact printing, that is by exposing a photographic plate to a source of light, through the model used as a mask, so that the faces of the model and of the plate covered with emulsion are in mutual contact, and afterwards developing the exposed plate. In the following, it will be agreed to call these images "positive" where the layout of the conductors is opaque, and the interposed space is transparent and the inverted image thereof "negative." If the models have been prepared to appear negative, that is, if the portions of opaque emulsion which have been removed correspond to the layout of the conducting elements, the master masks are positive.

Figure 2:
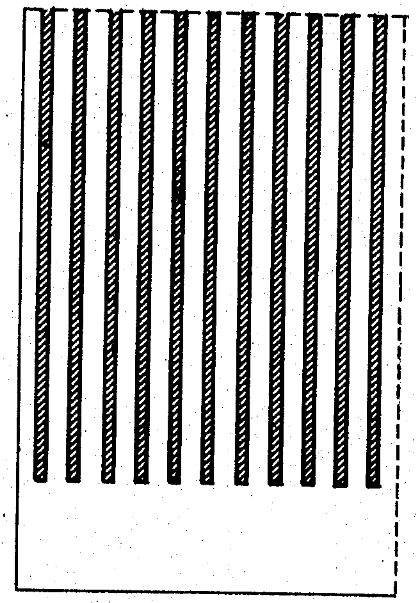
FIGS. 2, 3 and 4 show the master masks of the vertical and horizontal leads, and of the plugs provided for said portion of the circuit.
Figure 3:
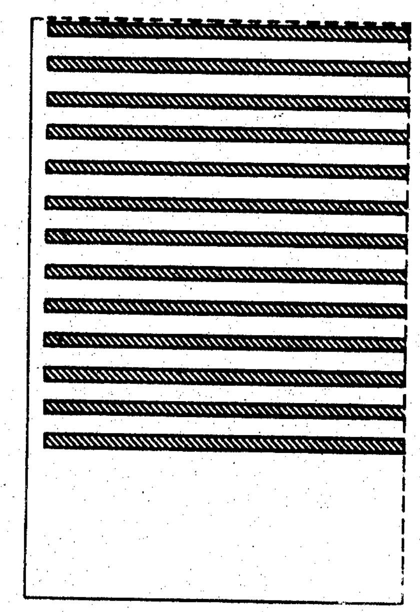
Figure 4:
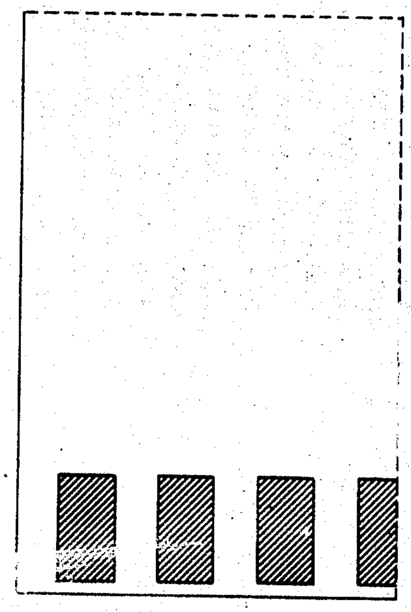

FIGS. 2, 3 and 4 respectively show: the positive master mask of the vertical leads, that of the horizontal leads, and that of the plugs, relative to the portion of printed circuit represented in FIG. 1.

A suitable number of negative master masks may be obtained by contact printing from the positive master masks. If, in these operations, the proper precautions, in respect mainly of the exposure time and of the developing operations, are used, as known by anyone skilled in the art, the degree of precision of the main positive and negative masks is practically the same as that of the high precision models. Due to the fact that the emulsioned face of the model and the emulsioned face of the plate are in contact, and the exposure is made by patically parallel light rays, the reproduced image is identical to the image of the model.

PARTIAL DEVELOPMENT AND COLLIMATION

To obtain the exact superposition of the images the plates employed are provided with special optical reference marks. These are obtained by scribing the high precision models, in exactly determined position with respect to the drawings of the conducting elements, according to suitable patterns, which will be exactly reproduced on the master masks.

Figure 5:
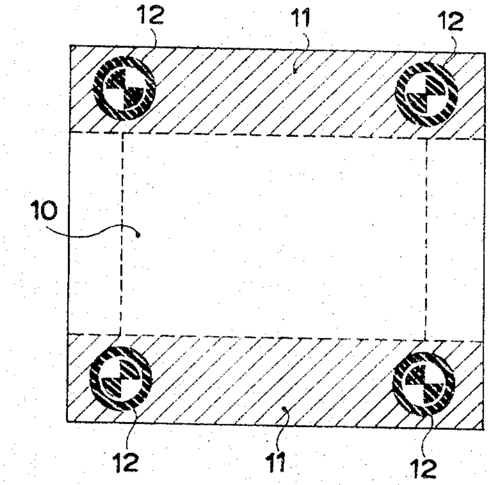
FIG. 5 schematically shows the form and position of the optical reference marks used for obtaining exact registration of the masks with respect to the latent images.

FIG. 5 schematically shows a plate wherein the reference numeral 10 indicates the area reserved to the printed circuit and reference numeral 12 indicates the four reference marks, formed, by example, by an opaque ring containing at its interior two 90° opaque sectors alternated with two 90° transparent sectors. For clarity, these marks have been drawn at a scale greater than the scale of the rest of the drawing. As may be seen, these reference marks are contained in two rectangular marginal areas, indicated by reference numeral 11, and shaded in the figure, which may be developed independently from the area 10, for example by immerging the plate vertically into a developing bath of suitable depth. It is thus possible to prepare plates in which the area reserved for the printed circuit is not exposed, whereas the lateral areas containing the reference marks are developed, and the marks are visible.

Alternatively, after having exposed an unexposed plate, a first time through a mask, it may be developed only in correspondence with the lateral areas, whereas in the central area the image remains latent and may be subsequently submitted to other exposures. In the following the term "collimation" will indicate the operation of superposing on a plate, developed only in the marginal areas, and provided with optical reference marks, and which may contain a latent image, a mask equally provided with reference marks. The collimation process is conducted in a device, called "collimator," provided with means, such as micrometric screws, by which the exact superpositions of the optical reference marks of the plate and of the mask is obtained by observation of a non-actinic light source underlaying the reference marks. Preferably of the two reference marks one will be the negative image of the other, and the exact superpositions will be revealed by the complete screening out of the non-actinic light source. After obtaining the superposition the mask and the partially developed plate are illuminated by a light source of suitable intensity and for a suitable time, in order to properly expose the partially developed plate, to obtain thereon a latent image, which corresponds to the negative of the superimposed mask, and is in exact position with respect to other latent images which may have already been impressed on the plate.

The light source may be practically punctiform and sufficiently removed to obtain a substantial parallelism of the incident rays. In this case it may be conveniently obtained by using a usual light projector, such as a slide projector, having suitable intensity and located at a sufficient distance from the collimator. An optical path of sufficient length may be obtained even in relatively restricted premises by one or more reflections on conveniently arranged mirrors. It is easy to obtain a maximum aperture of the light cone not greater than 3°. The collimation may be made by contact, if the emulsions of the mask and of the plate are directly in contact, or at a distance, if they are separated by a space interval. In certain instances, diffused light sources of two different types are used, as will be explained further.

The processes of partial development and collimation by optical reference marks are described in the cited Italian Pat. No. 816,880 and are referred to here only for completeness of the present disclosure.

SECONDARY MASKS

Two secondary masks, one comprising the positive image of all possible leads and plugs, and the other the positive image of all possible pads, are obtained by use of special and repeated collimating operations, from the master masks of the horizontal and vertical leads.

The complete lead and plug mask is obtained by exposing a first time an unexposed plate through the master negative mask of the vertical leads, and then developing the plate only in the area of the reference marks. This partially developed plate is then collimated a first time, with the negative master mask of the horizontal leads, and then with the negative master mask of the plugs. After developing, the complete positive lead and plug mask, shown in FIG. 6, is obtained.

The complete pad mask is obtained from the master masks of the vertical and horizontal leads by an exclusively optical-photographic method. The precision of the position of the pads, with respect to the leads and to the other pads, must be very high, because, in the case of boards bearing printed circuits on both faces, and of multi-layer boards, the corresponding pads on different faces or layers must result in being exactly superimposed. Moverover, the pads must be perfectly centered on the middle line of the connecting leads. These precision requirements are satisfied by the method hereby described.

Figure 7:
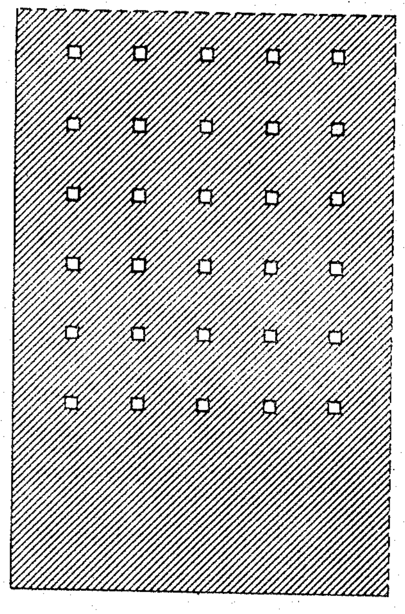
FIG. 7 is a mask resulting from composition of masks of FIGS. 2 and 3, and used for obtaining the pad mask.

As stated in this example the pitch of the square pad matrix is double that of the pitch of the leads. Therefore two masks, one for vertical leads and one for horizontal leads, having double pitch, are obtained by removing every second opaque line from a horizontal and a vertical positive master lead mask. By two subsequent collimations with an unexposed plate, and after complete developing of the same, a negative mask is obtained, whereby only small squares, having the side equal to the width of the lines, are transparent and correspond to the crosspoints between the lines of the two masks, as shown by FIG. 7. These squares are in fact the only areas of the plate not exposed after the two subsequent collimations.

Figure 8:
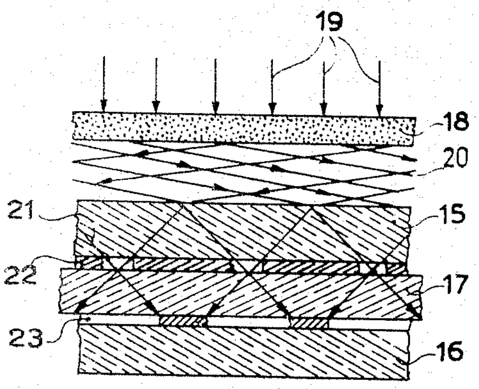
FIG. 8 schematically shows a first method for different light exposure to obtain the pad mask.

As is schematically indicated in FIG. 8, this mask 15 is positioned in the collimator, with the emulsioned surface facing downward, and is superimposed on a partially developed and not exposed plate 16, having the emulsioned surface facing upward; a glass plate 17 of suitable thickness is interposed therebetween. A special source of diffused light is located over the plates. This source is obtained, for example, from a plate 18 of opaline glass illuminated by a light of substantially parallel rays 19 provided by a light source sufficiently remote, which may be the practically punctiform light source already cited.

The light diffused by the lower face of the opaline glass plate 18 is practically uniform at all its points, and is directed in every direction in the space 20 comprised between the lower face of the opaline plate 18 and the upper, non-emulsioned face of the plate 15. Internally to this plate, the inclination of the light rays 21 with respect to the vertical is limited by the refractive index of the glass, and consequently this inclination cannot be greater than the critical angle. These rays, passing through the square transparent areas of the emulsion 22 of the plate 15, expose on the emulsion 23 of the plate 16 an enlarged and rounded-off image, which appears substantially circular, one for each of said square regions. Due to the uniformity of illumination, this image is perfectly centered with respect to the originating square area.

After development of the plate 16, these rounded images provide a positive mask comprising all possible pads in positions perfectly centered with respect to the cross points of the vertical and horizontal leads.

PARTIAL MASKS

The partial masks are specific for each printed circuit and may be obtained by methods of relatively limited precision.

A large scale drawing of the actual layout of the leads, is prepared on a transparent sheet of polyester, superimposed on a square network having for instance, a pitch four times that of the actual size lead pitch. Thus, a drawing in four-to-one scale may be obtained by drawing the path of the wanted leads along the lines of the square network. The drawing may be made manually by using colored pastels, or preferably, using adhesive opaque tape positioned along the required path. In the frequent case of boards printed on both faces, and according to a method already known in the art, both the leads on one face and those on the opposed face may be drawn on the same drawing, by using different colors, such as, red for one face and blue for the other one. Then the drawing is photographed a first time through a red filter and a second time through a blue filter. The first time only the blue leads are reproduced, the second time only the red ones. Thus, two photographs of the layout of the two opposed faces are obtained from the same drawing. This method is irrelevant with respect to the invention, but is wholly compatible with the same, as the invention requires the photographic reduction of the hand-made drawings, to an actual size scale, that is, in a four-to-one ratio and advantages may be taken of this photographic reduction to obtain the photographs of both faces of the board in an identical way.

The opaque tapes have a width such that, after the photographic reduction, their width will not be greater than the actual width of the lead required. In the present case the width of the tape will be, for example, 1.5 mm.

Figure 10:
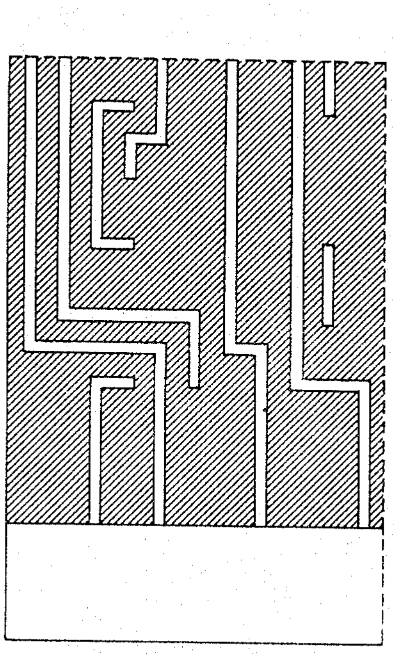
FIG. 10 shows the negative image of the connection leads of the portion of printed circuit of FIG. 1.

The reduced photographic image of the lead layout is used as an auxiliary negative mask, as is shown in FIG. 10. The portion of the photographic plate corresponding to the plug region must result in complete transparency, which may be obtained, either by rendering the corresponding area in the hand-made drawing, completely opaque, or by preventing the plate from becoming exposed in the same region by a proper screen.

Using a square network, of double pitch, and a second sheet of polyester superimposed on it, suitable opaque disks of adhesive materials are located on the second sheet at the cross points of the square network, in the positions corresponding to the pads actually required. The diameter of said disks will be substantially greater than four times the diameter of the actual pads. It will, for instance be 8 mm. Then the pattern of the pads thus obtained, is photographically reduced in a four-to-one ratio, for obtaining the auxiliary negative mask shown in FIG. 21, preferably on a photographic film, rather than on a plate.

For positioning the tapes and the disks as well as for the photographic reduction, the precision required is no better than that usually attainable in common practice and by photographic apparatus of normal quality. The reduced photographic masks may have a tolerance of, say, 0.1 mm.

Partial positive masks of the vertical and of the horizontal leads are then obtained from the auxuliary negative mask of the lead layout, by a particular method also employing the master masks of the horizontal and vertical leads. This method requires the use of a second diffused light source, schematically and partially illustrated and indicated by reference numeral 30 in FIG. 11. It consists of a frame containing a suitable number of electrical lamps 31, closed in the lower part by a plate of opaline glass 32, which, when the lamps are lighted, becomes a source of diffused light, and is superimposed, at a convenient distance, to the plates located in the collimator. This second diffused light source is more intense but less uniform that the aforesaid diffused light source, and is more suitable to the use in this phase of the described method, where no high precision, but a lesser exposure time to step up the production rate of the secondary masks, is required.

Figure 11:
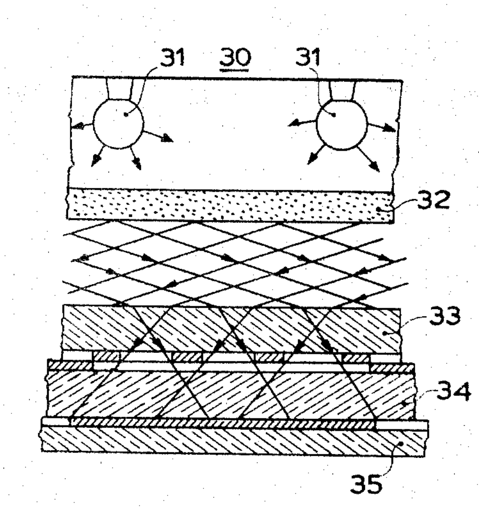
FIG. 11 schematically shows a second arrangement for diffused light exposure, to obtain the widened and uninterrupted lines of the leads on the partial masks.
Figures 12A, 12B:
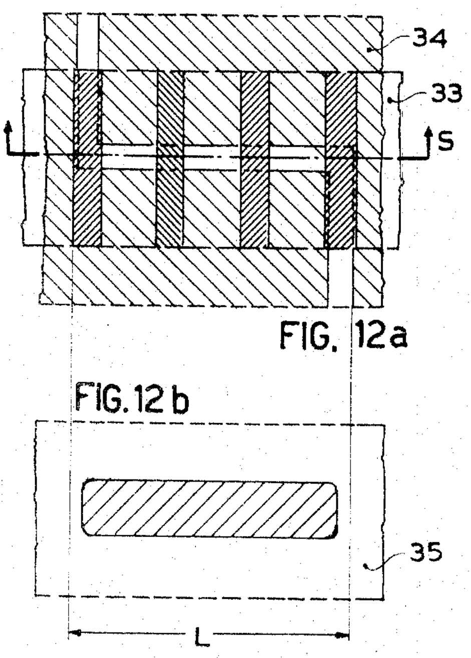

As shown in FIG. 11 the master positive mask 33 of vertical leads and the auxiliary negative mask 34 of the lead layout are superimposed in the collimator, with the emulsioned faces in mutual contact. These masks are the ones represented respectively in FIG. 2 and FIG. 10. In the lower part of the collimator at a distance from the mask emulsions, which may be the thickness of the plate 34, a photosensitive unexposed film 35 is located. FIG. 12 shows, in plan view, a small portion of the master vertical lead mask 33 superimposed on a corresponding portion of the auxiliary negative mask 34 comprising a horizontal and two vertical lines of a lead. The sectional view of the two plates, shown in FIG. 11, is made along the plane SS. It may be seen that the two vertical transparent lead lines of the mask 34 are covered by the vertical leads of the master mask 33, which are slightly wider, and the horizontal line is interrupted by the vertical leads of the same mask 33. However, due to the exposure to the diffused light source 30, and to the distance between the film and the masks, the positive image obtained on the film 35 is an enlarged horizontal uninterrupted line, with rounded corners as represented in FIG. 12b. Due to the inclination, which is of a maximum value, of the light rays traversing the superimposed masks of FIG. 11, the interruptions of the horizontal line of the mask 34 are without effect because the parts of the film 25 which are under the vertical leads of mask 33 are reached by the inclined light rays.

The measure of the transverse widening of the horizontal leads is at least equal to 100 percent of the mask lead dimensions, and the resulting image of the horizontal line should not exceed the length L comprised between the external limits of the vertical leads which are crossed by the horizontal lead.

By this method, using, together with the negative image of the drawing of FIG. 10 (auxiliary lead mask) first the master positive horizontal lead mask, then the master positive vertical lead mask, and finally a simple transparent plate, the following three positive masks are obtained, having the lead images transversally enlarged: a partial mask with only horizontal lead lines (FIG. 13), a partial mask with only vertical lead lines (FIG. 14) and a complete mask having all horizontal and vertical lead lines correspondingly enlarged (FIG. 15). As stated these masks are preferably obtained on a photographic film, rather than a photographic plate.

PLUG AND LEAD ARTWORK

Using the mask now available an artwork containing the full layout of the leads and the plugs may be obtained.

In a first step an unexposed plate, preferably already partially developed, and therefore provided with the optical reference marks, is collimated with the complete mask of FIG. 6 comprising the positive image of all leads and plugs, thus obtaining a corresponding negative latent image (FIG. 16). The collimation is made by contact, using the light source having substantially parallel rays; therefore the latent image has the same degree of precision as the master masks. In this latent image, all the areas which correspond to insulating regions, are exposed.

In a second step the same plate is collimated, by contact, using a composite mask, obtained by placing the partial film mask of the horizontal lines over the master mask of the vertical lead. The partial film mask is attached to the face of the non-emulsioned master mask plate.

FIG. 17 represents such a composite mask, whereby the opaque areas of the master mask are indicated by closely spaced shading and those of the partial mask shown by greater spaced shading. This superposition does not require a high degree of precision, because the enlargement of the lead lines in the composite mask ensures the covering of the horizontal lines of the latent image even if the precision of positioning in the vertical direction is low; and with regard to the horizontal positioning, it is sufficient to ensure that the extremities on the horizontal lines does not exceed the limits of the vertical lines of the master masks.

The emulsioned face of the master mask is put in contact with the emulsioned face of the plate to be exposed, and the collimation is precisely made. After exposure to the light source, all the regions of the latent image which are transparent in the composite mask will be exposed. This means that all of the plate, with the exception of the vertical leads, of the enlarged horizontal lines, and of the regions of the plugs, is exposed. Practically, after exposure, the only horizontal lines not exposed are those which underlie the enlarged horizontal lines of the partial mask (FIG. 18).

In a subsequent collimation, the latent image is exposed through a second composite mask, obtained by the superposition of the vertical partial mask on the horizontal master mask (FIG. 19). FIG. 20 shows the resulting latent image, comprising, in negative, all horizontal and vertical leads required by the layout, in the positions and dimensions determined by the complete secondary mask of FIG. 6, that is, with the maximal attainable precision. There will be, in addition, small non-exposed squares corresponding to the cross-points of the vertical and horizontal leads in the regions not occupied by any part of the printed circuit.

To delete these small squares, the plate with the latent image is collimated through a third composite mask formed by a simple transparent plate over which the mask of FIG. 15 is located. Therefore, all the areas of the plate which are not covered by the effective layout of the circuit, with enlarged leads, will be exposed.

In these collimations, the latent image of the plugs is not affected, because it is protected by the lower opaque region of the partial masks or of the complete mask. After development, a negative artwork comprising all leads and plugs, but no pads, is obtained.

The layout and the dimensions of the leads are attained by contact collimations of the master masks of leads and plugs, and therefore they have a very high degree of precision. The collimations through the composite masks have only exposed, and therefore deleted all elements not required by the layout. This method, which may be called a "subtractive" method requires more collimating operations than the method described, for instance, as in the cited U.S. Pat. No. 3,594,168, but enjoys the advantage that the precision of reproduction of the leads and plugs is that obtained in the preparation of the secondary complete mask of FIG. 6, and not through the subsequent collimation of composite masks, specific for each circuit, as would be necessary in an "additive" method.

Figure 9:
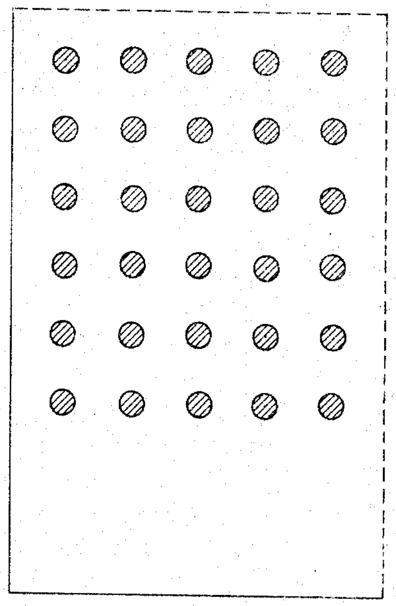
FIG. 9 shows said pad mask.

To complete the artwork the pads must be added. To effect this the partial mask of FIG. 21, containing in negative the pads actually required, is applied to a negative pad mask obtained by inversion from the secondary positive mask of FIG. 9, thus obtaining the composite mask of FIG. 22. With this composite mask an unexposed plate is collimated. The latent image resulting has, in positive, only the required pads, of dimensions and in the positions determined by the secondary pad mask. This latent image is shown in FIG. 23.

This latent image plate is finally collimated with the negative mask of leads and plugs, and thus, after development, the final complete art-work is obtained.

In producing by an image from a mask to a plate contact collimation, the resulting image on the plate is a specular, that is, a mirror image, therefore not coincident with the image of the mask.

The consideration about specularity or coincidence of the different images of masks obtained during the described method is generally irrelevant in the case of the master masks and of the secondary masks, which are usually symmetrical with respect to a vertical axis; however, an exception may be represented by the master plug mask. These considerations may be important with respect to the masks which reproduce the layout of the leads and pads effectively required in the circuit. However, these masks, as aforesaid, are obtained on thin photographic films, and do not require absolute precision; therefore each mask of this type may be made specular or coincident at will, according to how it is attached to the master mask to obtain the composite mask; that is, whether the emulsioned face is, or is not, in contact with the master mask plate.

The master masks, the secondary masks, the different latent images, and lastly the final artwork, are reproduced by contact from the high precision models, which are negative and coincident with the final layout of the printed circuit. Therefore, it may be seen that the positive masks and images are specular, and the negative are conicident. Therefore, the positive masks of FIGS. 2, 3, 4, 6, 9 and 23 are specular, and must be considered as seen through the plate glass, that is, from the non-emulsioned face. Such is the case also with the final artwork of FIG. 24, which as a consequence, may be used for contact photoetching the copper laminated board from which the printed circuit is to be made as the image resulting on the copper will be that of the required layout.

In any case, if, in any step of the process, it becomes necessary to invert the characteristics of coincidence and of specularity, this may be easily done by exposing, by contact, through a mask, a plate of the self-inverting type, and developing the same to obtain a positive but specular image of the mask.

It may be noted that the described method may be applied even if there are more than two directions of the possible leads, as in the case of three directions at 120°. It will be necessary, in this instance, to provide three different high precision models, and obtain from them three different master lead masks. The method of preparing the secondary masks of the leads and plugs, and that of the pads, does not differe substantially from that described.

To provide the partial masks of the enlarged lines for each of the three directions, it would be necessary, for instance, to provide three differently combined masks, each one containing the image of all the leads in two directions, and use each one of these masks in the same way as it is used in the master lead mask of FIG. 11, that is, superimposing on it a mask bearing the pattern of the lines actually required to obtain a partial mask with the enlarged lines required in the remaining directions.

These partial masks in each direction are then employed with the combined masks of the other two directions in the same way as shown by FIGS. 17 and 19 to delete from a complete negative image, by subsequent collimations, the negative images of the lines not required in the different directions.

Other possible changes in details, and particularly in the order followed in the different collimations are possible and may be easily carried on by a person skilled in the art, without departing from the spirit and scope of the invention.

What is claimed is:

1. A method for preparing photographic artwork in the form of a mask for photoetching a printed circuit comprising substantially round pads, connection leads between said pads in the form of rectilinear lines of uniform width arranged along at least two directions, said method comprising the providing of plurality of different master masks comprising the layout of all possible leads for the whole surface of the printed circuit, a separate mask respectively for each one of said directions, and of secondary masks comprising the layout of all possible pads on the surface of said circuit; said master masks and secondary masks being common for a plurality of printed circuits; and also providing a plurality of distinct partial masks comprising the layout of only the lines of connection leads specific to the desired circuit, along each one of said directions, said secondary pad masks and said partial masks of the connection lead lines being obtained by exposing a photosensitive medium to a radiation source through said master connection lead masks, and employing said partial masks and said master masks in combination to delete all the connection lead lines not specific to said printed circuit from another secondary mask containing all possible connection leads common to said plurality of printed circuits by subjecting said other secondary mask to a series of successive exposures by a radiation source through said combination of masks.

2. The method for preparing photographic artwork of claim 1, whereby the secondary pad mask is obtained by a process comprising the steps of:

contact collimation of an unexposed photographic plate with a master positive mask comprising at least part of the lead connection layout along a first direction, for obtaining, after exposure to substantially parallel light rays, a negative latent image of said part of the lead connection layout, contact collimation of said plate with a master positive mask comprising at least part of the connection lead layout along a second direction, to obtain, after exposure to substantially parallel light rays, a negative latent image of the crossover regions of said connection leads, development of said plate to obtain a negative mask comprising said crossover regions of said connection leads, distance collimation of an unexposed photographic plate with said mask comprising said crossover regions, and exposure of said plate through said mask to a suitable source of diffused substantially uniform at all points, sufficiently distant from said mask to obtain a latent positive image of rounded-off and enlarged regions corresponding in position to said crossover regions, such rounded off and enlarged regions being suitable to be used as a layout of all possible pads, and said process being followed by the development of said plate to obtain a positive secondary mask of the pad layout.

3. The method for preparing photographic artwork of claim 1, whereby the partial masks comprising respectively the lines of connection leads specific to a printed circuit, along a first direction, are obtained by a process comprising the steps of:

providing, by known means, an auxiliary negative mask of the layout of the connection leads specific to a predetermined printed circuit, superimposing said auxiliary negative mask onto a master positive mask of the connection leads along at least one direction in such a way, that the positive image of the connection leads of the master mask covers the negative image of the connection lead lines of said auxiliary mask along the same direction, distant collimation of a photosensitive unexposed film with said two superimposed masks, and exposure to a suitable diffused light source, at suitable distance from said superimposed masks, to obtain a positive latent image enlarged and uninterrupted of these specific connection lead lines which are not covered by the positive images of the master mask, and said process being followed by development of said photosensitive film to obtain a partial positive mask comprising enlarged and uninterrupted lines of the specific connection leads along one direction.

4. The method for preparing photographic artwork of claim 3, which further includes the steps of obtaining a complete positive mask comprising all enlarged and uninterupted lines of the specific connection leads of a predetermined circuit by distant collimation of an unexposed photosensitive film with only said auxiliary mask, and exposure to a suitable diffused light source suitably removed from said auxiliary mask, followed by development of said film to obtain said complete mask, and wherein said complete mask is employed to delete crossover points of leads, which points are not specific to said printed circuit from said other secondary mask containing all possible connection leads common to a plurality of printed circuits.

5. A method for preparing photographic artwork in the form of a mask, to be used for photoetching a printed circuit, whereby a negative mask comprising all connection leads specific to a single printed circuit is obtained by the use of a secondary complete positive mask comprising all possible connection leads common to a plurality of printed circuits, followed by deleting all the connection lead lines not specific to said printed circuit from a latent image obtained from said complete secondard mask, said deleting being obtained by the combined use of a plurality of partial masks comprising the layout of only the connection leads specific to the desired circuit and of master masks comprising the layout of all possible leads for the whole surface of the printed circuit, a separate mask respectively for each direction of the desired printed circuit leads.

6. The method for preparing photographic artwork of claim 5, whereby the negative mask comprising all possible connection lead lines specific for printed circuit is obtained by the following steps:

contact collimating an unexposed plate with said complete positive mask, to obtain a latent negative image comprising all possible connection leads along every direction and for the whole extension of the surface of the printed circuit, contact collimation of said plate comprising said latent image with a first composite mask obtained by superimposing to a master positive mask of the connection leads along a first direction, a partial positive mask comprising the lines of the connection leads specific for the printed circuit according to a second direction and exposed at illuminating parallel light rays to obtain a first modified latent image, contact collimation of said plate comprising said first modified latent image with a second composite mask obtained superimposing to a master positive mask of the connection leads along said second direction a positive mask comprising the lines of the connection leads specific for the printed circuit along said first direction, and exposure to parallel light rays to obtain a second modified latent image, said process being followed by development of said plate to obtain the required positive mask.

7. The method for preparing photographic artworks of claim 6, whereby the plate comprising the second modified latent image is collimated with said complete positive mask comprising all the lines of the specific connection leads, and exposure to parallel illuminating rays to obtain a third modified latent image, followed by development of said plate to obtain a positive mask comprising all and solely the connection lead lines specified by the printed circuit.

8. A method for preparing artwork for photoetching printed circuit boards of the type having pads with connection leads therebetween comprising lines of uniform width arranged along at least two directions, the method comprising:

forming a plurality of master masks defining the layout of all possible leads for the entire surface of the printed circuit a separate mask respectively for each of said directions, forming a plurality of secondary masks defining the layout of all possible pads on the surface of the desired printed circuit by exposing a photosensitive medium to a radiation source through said master connection lead masks in an optical photographic process, said master masks and said secondary masks being common for a plurality of printed circuits, and forming a plurality of distinct partial masks defining the layout of the lines of the specific connection leads of each desired printed circuit by exposing a photosensitive medium to a radiation source through said master connection lead masks in an optical photographic process, and employing said partial masks and said master masks in combination to delete all the connection lead lines from another secondary mask containing all possible connection leads common to said plurality of printed circuits by subjecting said other secondary mask to a series of successive exposures by a radiation source through said combination of masks.

9. The method for preparing photographic artwork of claim 8, whereby the secondary pad mask is formed by the following steps:

contact collimating an unexposed photographic plate employing a master positive mask comprising at least part of the lead connection layout along a first direction, for obtaining a negative latent image of said part of the lead connection layout after exposure to substantially parallel light rays;

contact collimating said plate with a master positive mask comprising at least part of the connection lead layout along a second direction, to obtain, negative latent image of the crossover regions of said connection leads after exposure to substantially parallel light rays, developing said plate to obtain a negative mask comprising said crossover regions of said connection leads;

distance collimating another unexposed photographic plate with said mask comprising said crossover regions, and exposure of said plate through said mask to a suitable source of diffused light substantially uniform at all points, sufficiently distant from said mask to contain a latent positive image of rounded-off and enlarged regions corresponding in position to said crossover regions, such rounded off and enlarged regions being suitable to be used as layout of all possible pads; and developing said other plate to obtain a positive secondary mask of the pad layout.

10. The method for preparing photographic artwork of claim 8, whereby the partial masks comprising respectively the lines of connection leads specific to a printed circuit, along a first direction, are obtained by a process comprising the following steps:

providing, by known means, an auxiliary negative mask of the layout of the specific connection leads of a predetermined printed circuit, superimposing said auxiliary negative mask on a master positive mask of the connection leads along at least one direction such that the positive image of the connection leads of the master mask covers the negative image of the connection lead lines of said auxiliary mask along the same direction, distant collimation of a photosensitive unexposed film with said two superimposed masks, and exposure to a suitable diffused light source, at suitable distance from said superimposed masks, to obtain an enlarged and uninterrupted positive latent image of these specific connection lead lines which are not covered by the positive images of the master mask, and developing said photosensitive film to obtain a partial positive mask comprising enlarged and uninterrupted lines of the specific connection leads along one direction.

11. The method for preparing photographic artwork of claim 8, whereby the negative mask comprising all possible connection lead lines specific for a printed circuit is obtained by the following steps:

contact collimating an unexposed plate with said complete positive mask, to obtain a latent negative image comprising all possible connection leads along every direction and for the whole extension of the surface of the printed circuit;

contact collimation of said plate comprising said latent image with a first composite mask obtained by superimposing on a master positive mask of the connection leads along a first direction, a partial positive mask comprising the lines of the connection leads specific for the printed circuit along a second direction and exposing said plate to illuminating parallel light rays to obtain a first modified latent image, contact collimating said plate comprising said first modified latent image with a second composite mask obtained by superimposing a master positive mask of the connection leads along said second direction to a positive mask comprising the lines of the connection leads specific for the printed circuit along said first direction, and exposure to parallel light rays to obtain a second modified latent image; and developing said plate to obtain the required positive mask.

* * * * *